US010810866B2

(12) United States Patent
Barth et al.

(10) Patent No.: US 10,810,866 B2
(45) Date of Patent: Oct. 20, 2020

(54) PERIMETER BREACH WARNING SYSTEM

(71) Applicant: Federal Signal Corporation, Oak Brook, IL (US)

(72) Inventors: Justin Karl Barth, Elgin, IL (US); Paul J. Ferrara, Frankfort, IL (US); Albena Iotova-Gagnaire, Elmhurst, IL (US); Michael K. Pula, Naperville, IL (US); Scott T. Rohrbaugh, Bellevue, WA (US)

(73) Assignee: FEDERAL SIGNAL CORPORATION, Oak Brook, IL (US)

( * ) Notice: Subject to any disclaimer, the term of this patent is extended or adjusted under 35 U.S.C. 154(b) by 0 days.

(21) Appl. No.: 16/560,219

(22) Filed: Sep. 4, 2019

(65) Prior Publication Data

US 2020/0202699 A1    Jun. 25, 2020

Related U.S. Application Data

(60) Provisional application No. 62/782,096, filed on Dec. 19, 2018.

(51) Int. Cl.
*G08B 29/18*    (2006.01)
*G06K 9/00*    (2006.01)
(Continued)

(52) U.S. Cl.
CPC .......... *G08B 29/188* (2013.01); *B60R 25/104* (2013.01); *B60R 25/305* (2013.01);
(Continued)

(58) Field of Classification Search
CPC ................. G08B 29/188; G08B 25/08; G08B 13/19647; G08B 15/02; G08B 15/00;
G08B 21/0297; G08B 21/02; G08B 13/187; B60R 25/104; B60R 25/305; B60R 25/31; B60R 2025/1013; G08G 1/0962; G06K 9/00369; G06K 9/00288; G06K 9/00805; G01S 7/41; G01S 13/886; G01S 13/867; G01S 13/56;
(Continued)

(56) References Cited

U.S. PATENT DOCUMENTS 5,315,285 A    5/1994 Nykerk
7,476,013 B2    1/2009 Gergets et al.
(Continued)

FOREIGN PATENT DOCUMENTS

DE    20 2013 006467 U1    10/2014
DE    10 2015 103362 A1    9/2015
(Continued)

OTHER PUBLICATIONS

US 8,950,913 B2, 02/2015, Gergets et al. (withdrawn)
(Continued)

*Primary Examiner* — Brian Wilson
(74) *Attorney, Agent, or Firm* — Merchant & Gould P.C.

(57) ABSTRACT

A system for object detection within a monitored zone around a vehicle includes: at least one processor; and memory encoding instructions which, when executed by the processor, cause the system to: detect an object; and suppress an alert associated with detection of the object when a size of the detected object is below a lower size threshold value or above an upper size threshold value.

18 Claims, 7 Drawing Sheets

(51) Int. Cl.
| | |
|---|---|
| *G01S 13/86* | (2006.01) |
| *G01S 13/56* | (2006.01) |
| *G01S 13/88* | (2006.01) |
| *B60R 25/104* | (2013.01) |
| *B60R 25/31* | (2013.01) |
| *B60R 25/30* | (2013.01) |
| *G01S 7/41* | (2006.01) |
| *B60R 25/10* | (2013.01) |

(52) U.S. Cl.
CPC .............. *B60R 25/31* (2013.01); *G01S 7/41* (2013.01); *G01S 13/56* (2013.01); *G01S 13/867* (2013.01); *G01S 13/886* (2013.01); *G06K 9/00288* (2013.01); *G06K 9/00805* (2013.01); *B60R 2025/1013* (2013.01)

(58) Field of Classification Search
CPC ... G01S 2013/9316; G01S 2013/93271; G01S 2013/93272; G01S 2013/93274; G01S 7/414; G01S 13/931
See application file for complete search history.

(56) References Cited

U.S. PATENT DOCUMENTS

| | | | |
|---|---|---|---|
| 7,746,794 B2 | 6/2010 | Sink | |
| 9,002,313 B2 | 4/2015 | Sink et al. | |
| 9,747,795 B1* | 8/2017 | Espinosa | G08B 13/19647 |
| 2014/0313330 A1* | 10/2014 | Carey | G08B 13/19608 |
| | | | 348/143 |
| 2015/0009061 A1* | 1/2015 | Lundqvist | G01S 13/87 |
| | | | 342/27 |
| 2015/0022331 A1 | 1/2015 | Huth et al. | |
| 2015/0348417 A1* | 12/2015 | Ignaczak | G08G 1/166 |
| | | | 340/435 |
| 2017/0371339 A1* | 12/2017 | Charette | G05D 1/0088 |
| 2018/0011180 A1* | 1/2018 | Warnick | G01S 13/06 |
| 2018/0080263 A1* | 3/2018 | Rose | E05B 81/64 |
| 2019/0039566 A1 | 2/2019 | Ciuperger | |
| 2019/0122516 A1* | 4/2019 | Lorenzetti | H04N 5/772 |
| 2019/0308587 A1* | 10/2019 | Salter | B60Q 1/2611 |

FOREIGN PATENT DOCUMENTS

| | | |
|---|---|---|
| ES | 1 223 046 U | 1/2019 |
| GB | 2524660 A | 9/2015 |
| JP | 2011 108046 A | 6/2011 |

OTHER PUBLICATIONS

International Search Report and Written Opinion for PCT/US2019/066588 dated Mar. 27, 2020, 17 pages.
Aegis Controls, "360 Anti-Ambush," http://www.aegiscontrols.net/aegis-360/, Copyright 2018, Aegis Controls, 2 pages.
6 Watch, "Virtual Surveillance Partner (VSP)," https://www.6-watch.com/, Copyright 2018, 6-Watch, 5 pages.
Police Magazine, "Ford Adds Officer Safety Features to 2020 Police Interceptor Utility Hybrid," https://www.policemag.com/501517/ford-adds-officer-safety-features-to-2020-police-interceptor-utility-hybrid, Jan. 9, 2019, 10 pages.
Stopambush, "Installation Instructions," downloaded Sep. 4, 2019, 9 pages.

* cited by examiner

PERIMETER BREACH WARNING SYSTEM

INTRODUCTION

Situational awareness is a concept most can relate to; crossing a busy street or choosing the best apple each requires a certain level of environmental awareness. In most cases, the amount of available information is much greater than the ability to process or retain it, especially in real time. As a result, experience and best practices are often called upon to complete the task in a timely manner. Examining the outside of an apple for marks or bruises can often provide sufficient confidence in its quality, but every now and again a bad one might sneak past.

Smoke detectors are a very common appliance and are all but synonymous with environmental and personal safety. As pervasive and comforting as they might be, it is also likely they are on most people's short list of nuisance alarms. A more accurate description of the need surrounding smoke detectors might be "danger" alarm, in that the detector should sound if danger is present. The mechanism by which these devices traditionally choose to measure danger is by "presence of smoke", and yet smoke can be present without the element of danger. For example, it is possible for a smoke detector to activate while cooking, using a fireplace, or conducting another activity that produces "smoke" without the element of danger (presuming responsible operation). If this experience is frequent enough, the device might even be disabled during these activities, or removed altogether, rendering it unable to detect any form of smoke, dangerous or otherwise.

The ability to assign severity levels to, or better still to identify the context of, an event or observation could be referred to as "filtering". By extension, filtering could be said to directly influence the likelihood of false-positive detection, in that false-positives could be reduced by appropriately filtering an event or observation. False-positives, or the misidentification of an event or observation, can have varying degrees of consequence, from the mundane to the severe, and almost always contribute to over-saturation or frustration. In the case of the smoke alarm, it is easy to see how filtering out the cooking smoke while still identifying a cooking fire would be immediately beneficial.

Most detection systems traditionally ask the data consumer to be the arbiter of importance. For example, lane departure and collision avoidance systems call the driver's attention to "general distress", typically with an audible tone or vibration; it is the driver's responsibility to re-evaluate his or her surroundings and determine what the system has deemed "abnormal" or "dangerous", and act (or disregard) accordingly. Traditional home or vehicle alarm systems, when armed, alert with any perceived threat regardless of who is approaching with what intention.

Some systems attempt to refine the evaluation area with visual cues (e.g., side mirror indicators), but final evaluation is still dependent on the driver. Recently, some systems have started to take action on their own (for example, pre-collision braking and lane departure correction). While these systems are more advanced in their actions, they indirectly presume that their observations are 100 percent accurate, or that action is not inherently detrimental (similar to smoke alarm activation, where no immediate negative consequence is derived from the observation of anything that appears to be smoke from an unintended fire). Consider active cruise control breaking in an automobile: while braking should be an expected part of any driving environment, unexpected activation can cause unintended and/or unnecessary traffic disruption, and at minimum likely contributes to the "nuisance threshold" of the operator. As a smoke detector might be disarmed by a frustrated homeowner, over-saturation in this environment can lead to a deactivation of a safety feature, negating any future positive effects.

SUMMARY

In one aspect, a system for object detection within a monitored zone around a vehicle includes: at least one processor; and memory encoding instructions which, when executed by the processor, cause the system to: detect an object; and suppress an alert associated with detection of the object when a size of the detected object is below a lower size threshold value or above an upper size threshold value.

DETAILED DESCRIPTION

The following description is intended to convey the operation of exemplary embodiments to those skilled in the art. It will be appreciated that this description is intended to aid the reader, not to limit the disclosure. As such, references to a feature or aspect are intended to describe a feature or aspect of an embodiment, not to imply that every embodiment must have the described characteristic.

The disclosure pertains in general to the detection of an object in an environment, and specifically to the accurate classification of said object in real time, around a police, emergency, or military vehicle. This allows for objects meeting certain criteria to be ignored, while elevating the importance of the remaining objects, reducing post-detection examination time, and minimizing false-positive over-saturation.

The concept proposed is intended to refine a detection system, reducing the number of times the user is asked to analyze a situation, while not yielding full decision-making control to the system on its own. At the present, the state of the art has not progressed far enough to reliably remove the user in the false-positive rejection process, but it is reasonable to assume the evolution of technology will eventually enable the system to confidently analyze a situation and only present the user with instructions on how to act, or take action itself. This must ideally be done without increasing the probability of a false negative by dismissing a critical event as irrelevant.

Consider first a peripheral awareness system. This system, using a plurality of sensors, perceives the environment in which it is installed and determines when an object enters, moves about, or leaves its area of awareness. These sensors may observe their environment in many ways, possibly several at the same time, including but not limited to electromagnetic wave emission and/or observation (radar, thermal imaging, visible light, and other forms of measurable radiation), relative interaction of materials, magnetic interaction, mass interaction, and seismic or acoustic vibration (or other forms of mass oscillation). Perceiving a change in measurable quantity through one or many sensors, the system compares the change to a set of rules designed to parallel general logic and human rational, in order to refine the relative intent of the detected object.

For example, the system perceives an object entering its area of observation and at some later time (a configurable value) the system checks the new position of that same object. Using these two known positions, the system can calculate the direction and speed (magnitude) of the object (this will be referred to as a vector or vectorization). The system can now project where the object is going and how soon it will get there, and can update this projection regularly as the object moves through its area of observation. Having been configured with an understanding of how to react (and allowing for either self-learning or future adjustment of configuration), the system can decide whether this object warrants concern and take appropriate action. This action may be, but is not limited to one or more of the following: ignore (but continue to monitor) the object, produce a visual alert for internal consumption, produce an audible alert for internal consumption, produce a visual deterrent for external consumption, produce an audible deterrent for external consumption, take evasive action (e.g., move the system so that the object is no longer considered threatening), or take protective action (e.g., change the environment in a way that results in increased protection and/or awareness on behalf of the system or by virtue of action minimizes potential danger to itself and/or its surroundings).

A hierarchical approach to technology integration, as discussed above, could be used to expand awareness of a situation. Such a system might implement, but is not limited to, any combination of the following concepts.

Consider a simple motion detection system with alerts suppressed when the size of the detected moving object is below one threshold value or above another, and/or when an estimate of object speed or direction of motion, filtered to suppress alerts corresponding to objects measured to have a speed below a threshold value in any direction, or a speed above a threshold in any direction, and/or speeds above/below a different set of respective thresholds when an object is measured to move in a particular direction. In addition, motion vectors of said objects could be linearly extrapolated, and alerts suppressed when motion vector extrapolation does not intersect a monitored (e.g., "danger") zone. A monitored zone (described by a perimeter around all or part of a vehicle and the area between the perimeter and the vehicle—see, e.g., monitored zone 320 in FIG. 3) could be further modified (in size, position, or other) by the speed of a moving object to accommodate a dynamic environment.

Furthermore, incorporation of machine learning, such as Artificial Intelligence (AI), could allow for human-like analysis of environmental conditions. Identifying (an) object(s) as human allows for context analysis such as emotion, intent, focus, urgency, mechanics (e.g., gait and other unique body motion descriptors), and other uniquely human data-points which can be used to better qualify the nature of an object moving through an environment. Recognizing the human body, or a human-sized object, could allow an alert to be suppressed if a detected object is determined by AI to not be human. Including an estimate of object speed/direction, filtered to suppress alerts corresponding to humans measured to have a speed below a threshold value in any direction, or a speed above a threshold in any direction, and/or speeds above/below a different set of respective thresholds when a human is measured to move in a particular direction would further refine object detection.

Such detection could also be augmented with motion vectors extrapolated linearly, and alerts suppressed when motion vector extrapolation does not intersect a monitored zone, or where the size of a monitored zone or the position of its border is modulated by the speed of a moving object. Measurement of human features (physical description, emotion, etc.) could also be used to supplement the system, where AI-based inference of human mood allowed for alerts to be suppressed when mood is not classified as consistent with an alert category of moods. For example, facial landmarks can be identified from the captured image(s) and used for estimation of emotion. Similarly, intention based upon body position can be estimated by segmenting the image into various components of the body of the object.

An analysis of gait could be used in a similar way, where alerts are suppressed when gait is not determined to be consistent with the carriage of a weapon. AI interpretation of attributes could supplement the system as well, such as classification of hand-held objects (or objects in general), where alerts are suppressed when objects are classified as not a weapon, or classification of a person's clothing, where alerts are suppressed when the clothing is classified as consistent with a police officer's uniform.

Other techniques could also be used to determine an identity if the object if a human body. For example, the camera device can be used to capture an image of the face, and facial recognition can be used to identify the human. Alerts can be suppressed if the human is known (e.g., the driver or passenger of the vehicle).

Electromagnetic wave emission and/or observation (radar, thermal imaging, visible light, and other forms of measurable radiation), relative interaction of materials, magnetic interaction, mass interaction, and seismic or acoustic vibration (or other forms of mass oscillation), or other forms of EM measurement may be used to contextualize an observed event. A hierarchical approach is applied to object(s) (e.g., one or many objects entering the peripheral awareness of a system) detected by a sensor or set of sensors within a limited field of regard, loosely centered on the law enforcement, emergency, or public service vehicle.

Figure 1:
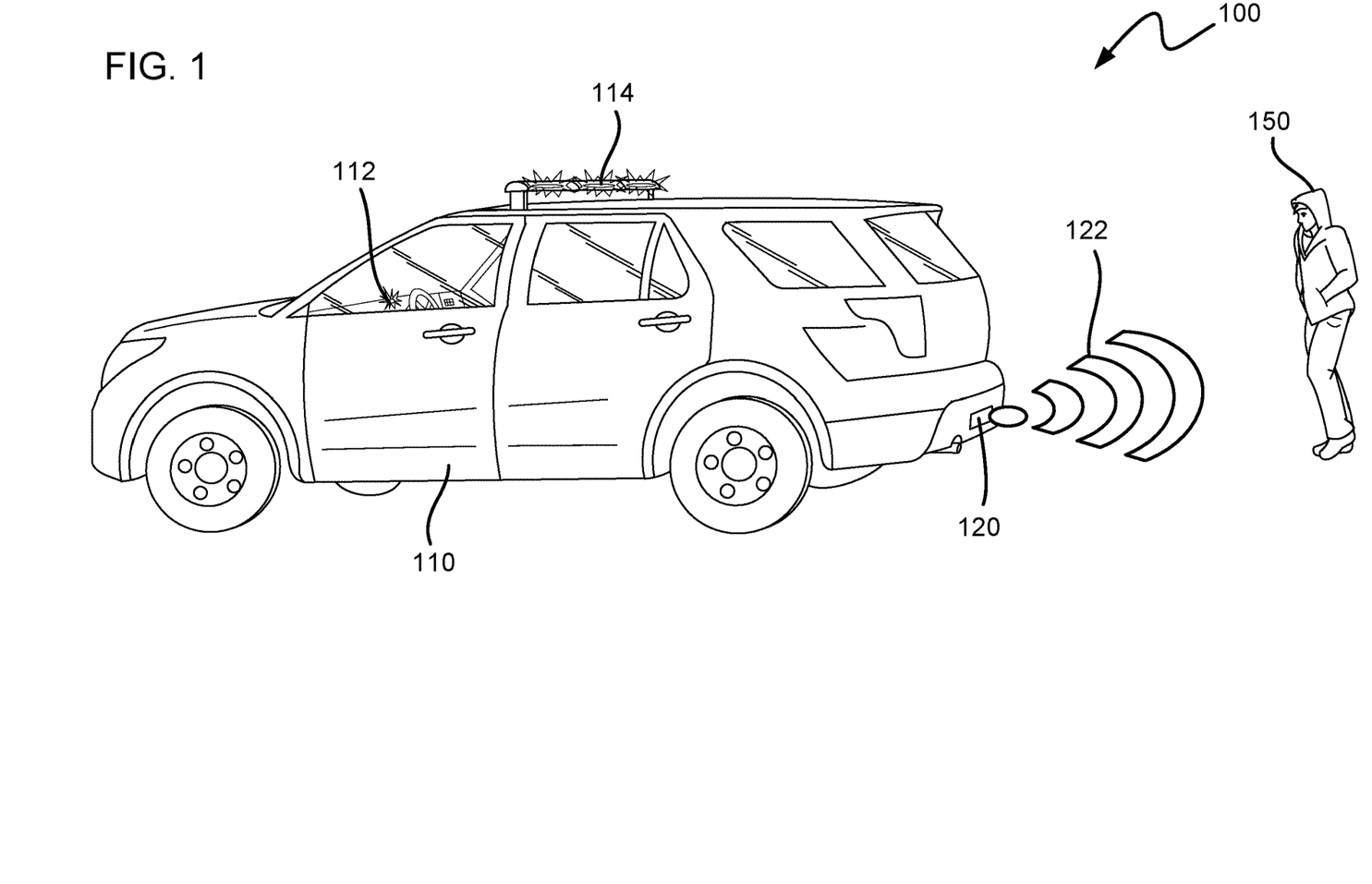
FIG. 1 shows an example perimeter breach warning system.

Optical and video analytic methods may also be used to limit the false-positive rate of an anti-ambush system. A hierarchical approach is applied to object(s) (e.g., one or many objects entering the peripheral awareness of a system) detected by a camera or set of cameras within a limited field of regard, loosely centered on the law enforcement, emergency, or public service vehicle:

Referring now to FIG. 1, in one specific embodiment, a perimeter breach warning system 100 is provided for an emergency vehicle 110, such as police or fire vehicle. The system 100 uses one or more sensing devices 120 on the vehicle 110 to detect an object 150 (e.g., human) that breaches a perimeter surrounding the vehicle 110.

In this instance, the system 100 uses a Doppler radar system 122 for detection of the object 150. The system 100 can provide interior alerting 112 and/or exterior alerting 114 when the object 150 is detected, as described herein. One example of such a Doppler radar system is the Aegis 360 Anti-Ambush system from AEGIS Controls of Florida. This system includes five Doppler radar sensors that are used to detect motion up to 25 feet away.

Figure 2:
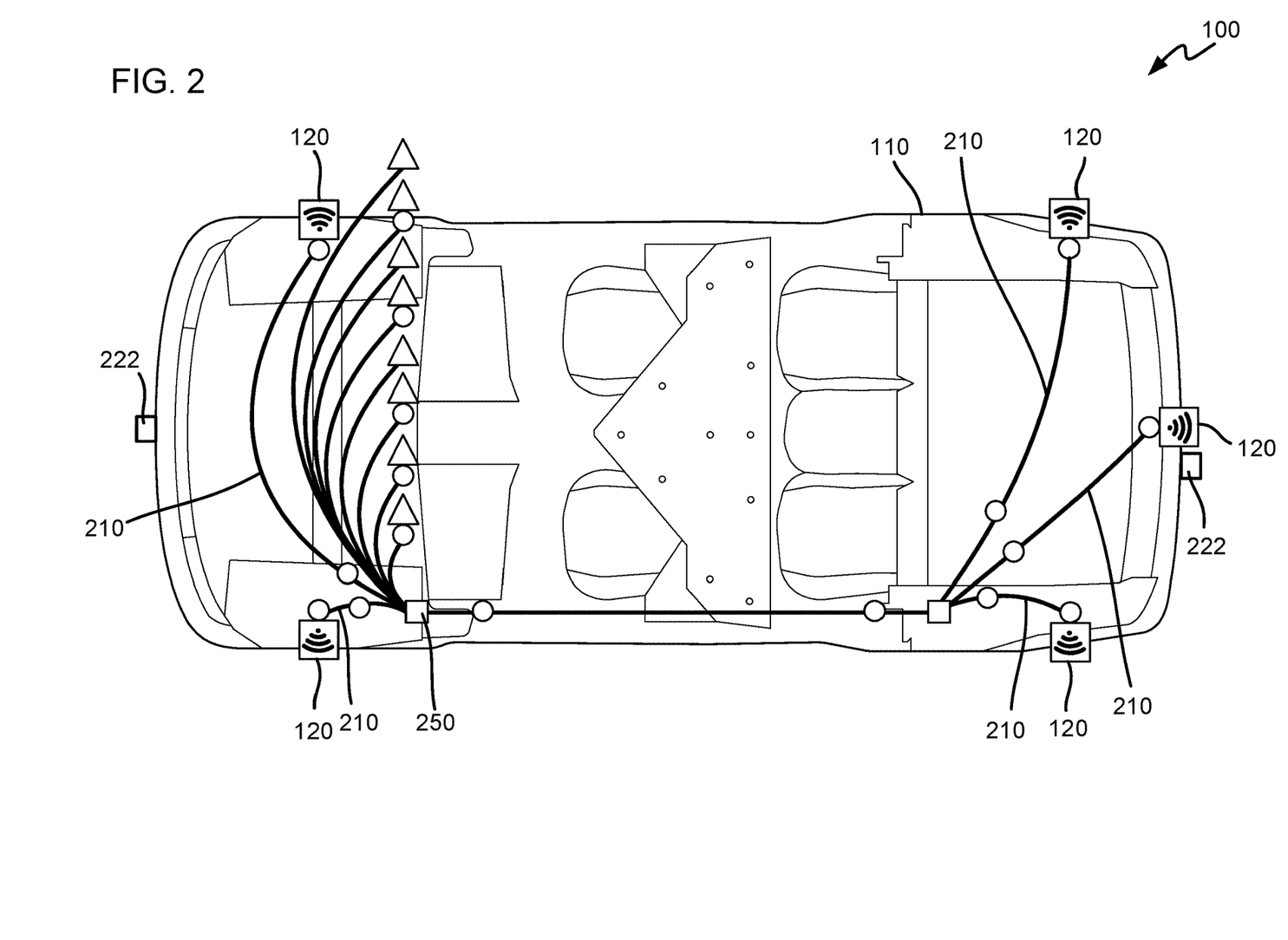
FIG. 2 shows another view of the perimeter breach warning system of FIG. 1.
Figure 3:
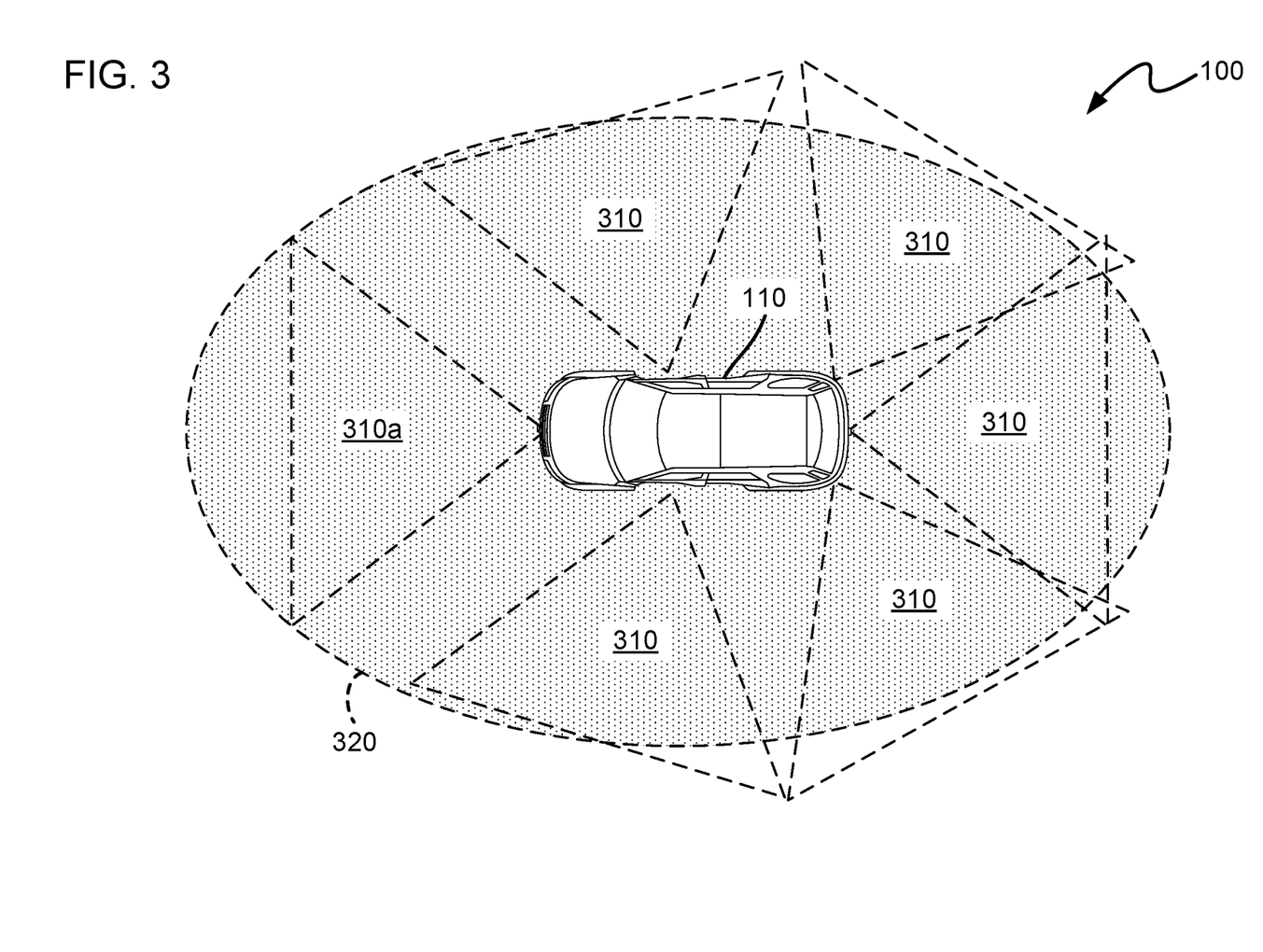
FIG. 3 shows another view of the perimeter breach warning system of FIG. 1.

For example, referring now to FIGS. 2-3, the sensing devices 120 are positioned at various points on the outside of the vehicle 110. In this instance, the sensing devices 120 are positioned generally at the front and rear sides of the vehicle 110 and at the back of the vehicle 120. Wires 210 connect each of the sensing devices 120 to a control device 250. In other implementations, wireless connections can also be used.

As depicted in FIG. 3, each of the sensing devices 120 forms a field of view 310 that together define a monitored zone 320. Note that the field of view 310a can be formed by another sensing device, such as another Doppler radar device or a camera device. The monitored zone 320 encompasses the entire vehicle 110 and defines a perimeter spaced from the vehicle 110.

The sensing devices 120 function to identify objects entering and exiting the monitored zone 320. For example, as described more fully above, the sensing devices 120 are configured to identify objects entering and exiting the monitored zone 320. This identification can include one or more of the existence of the object, the size or type of the object, and/or the direction/speed of travel of the object.

Figure 4:
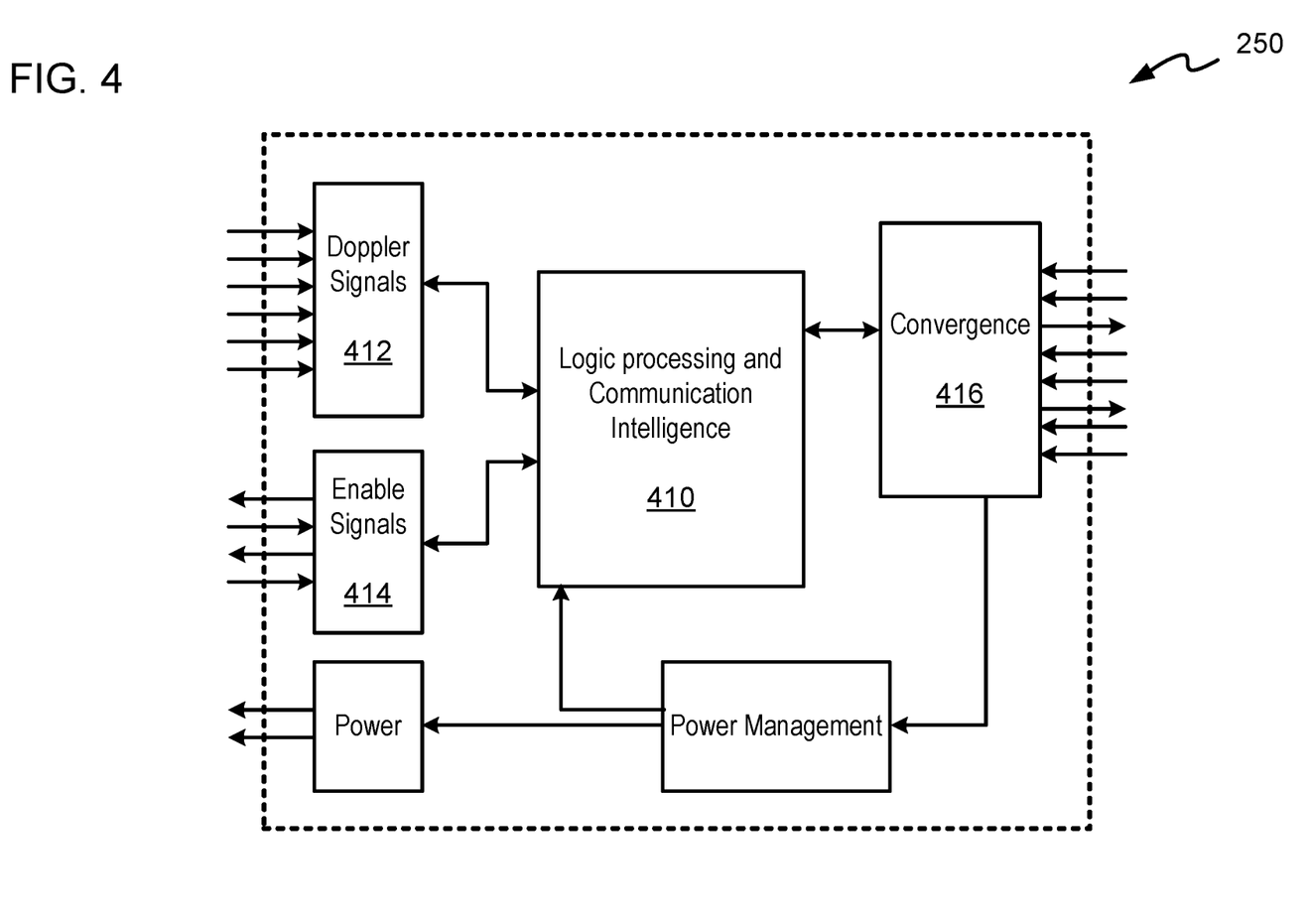
FIG. 4 shows an example control device of the perimeter breach warning system of FIG. 1.

Referring now to FIG. 4, additional details about the control device 250 of the system 100 are provided. The control device includes a processor 410, as described more fully below. The control device 250 includes a sensing device input module 412 that is configured to receive signals from the sending devices, such as the Doppler radar devices. The control device 250 further includes an input module 414 that receives one or more signals that enables or disables the system 100.

Figure 5:
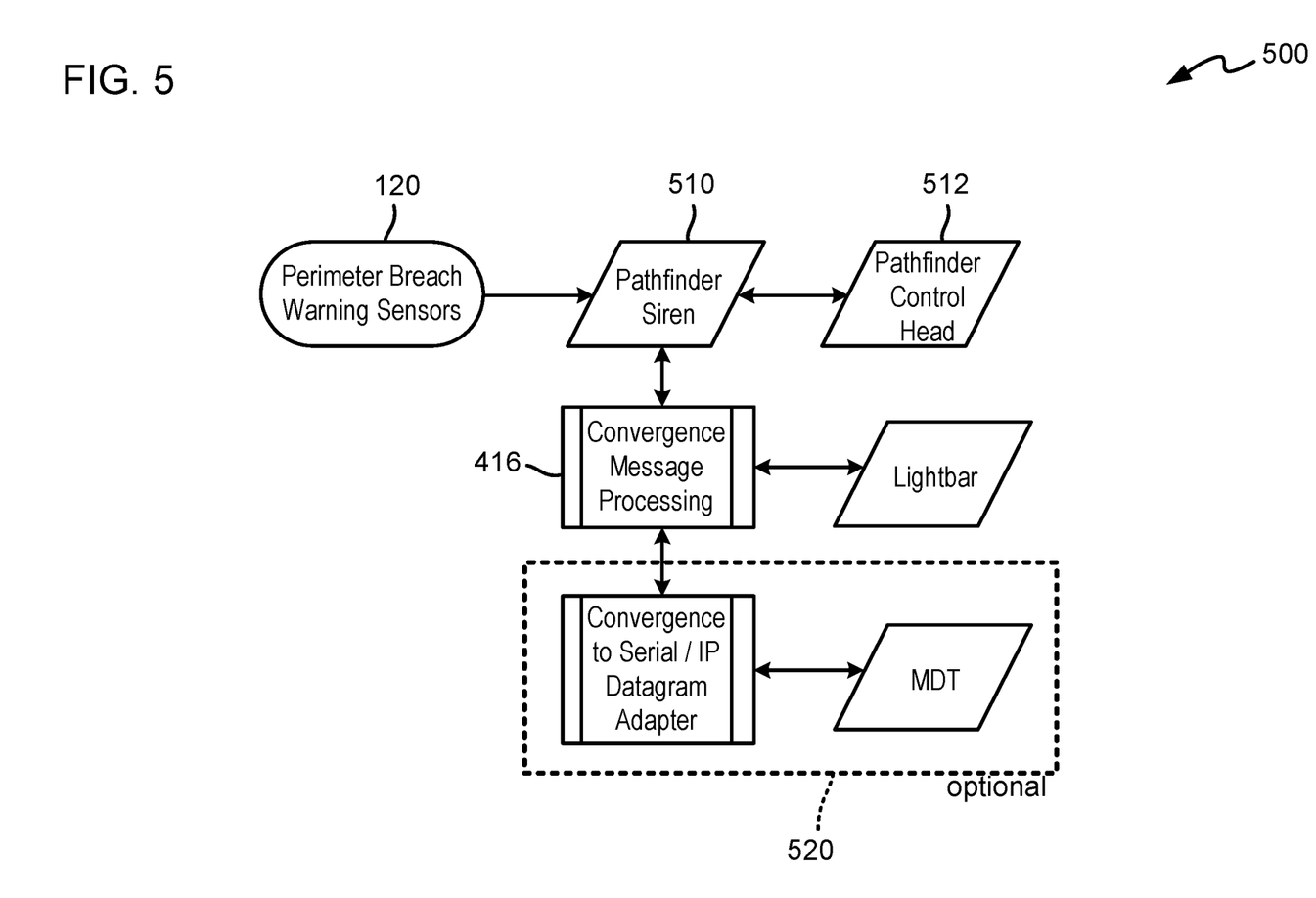
FIG. 5 shows an example workflow of the perimeter breach warning system of FIG. 1.

Finally, the control device 250 includes a communications module 416 that controls communications between the control device 250 and other devices. These other devices can include a mobile data terminal (MDT) 520 positioned in the vehicle 110 or a mobile device (e.g., a smartphone) of the driver or passenger (e.g., police officers) of the vehicle 110.

In some embodiments, the communications module 416 can further trigger alerts, such as a lights and siren system (LaSS) 510 of the vehicle 110. An example of such a LaSS system is the Pathfinder® siren/light controller from Federal Signal Corporation of Illinois. For example, output from the sensing devices 120 can be connected to the LaSS 510 that controls a head programmed to turn the exterior alerting 114 of the vehicle 110 on and off.

In some examples, the LaSS 510 includes one or more lights attached to the vehicle 110. For example, the vehicle 110 can include a lightbar. Examples of such a lightbar are provided in U.S. Pat. Nos. 7,476,013, 8,950,913, and 9,002,313. In some examples, specific segments of the lightbar are activated to indicate a location or speed of the object.

The output can also be provided to the communications module 416 that, in turn, communicates with other devices, such as the MDT 520. Further, the alerts can be provided to a remote destination through a network. One example of such a remote destination is an integrated municipal management console, such as that disclosed in U.S. Pat. No. 7,746,794. In another instance, the alerts can be provided to other emergency personnel within a specified area of the vehicle 110. Other configurations are possible.

The alerting by the communications module 416 can be configurable. For example, the police officer can turn alert on the MDT 520 and smartphone on and off as desired. In some examples, object detection is activated when the vehicle is stationary (e.g., transmission placed in "park") and deactivated when the vehicle moves (e.g., transmission placed in "drive") or exceeds a speed threshold, such as 5 mph or 10 mph.

In some embodiments, the sensing devices can include other types of devices mounted to the vehicle 110. For example, one or more camera devices 222 can be included. See FIG. 2. These camera devices 222 can capture still and moving images of the space around the vehicle 110 to further enhance the detection of objects entering and leaving the monitored zone 320. Examples of such cameras include Internet protocol (IP) and/or universal service bus (USB) cameras that capture still or moving images at a particular speed (e.g., 30 fps) and resolution (e.g., 1080 p). Other configurations are possible.

Further, the camera devices 222 can work in tandem with the other sensing devices 120. For example, upon one of the sensing devices 120 detecting the object 150, one or more of the camera devices 222 can be activated to capture images of the object 150 for display to the driver or passenger. Further, the camera devices 222 can be used to determine various aspects of the object 150, as provided further below.

Figure 6:
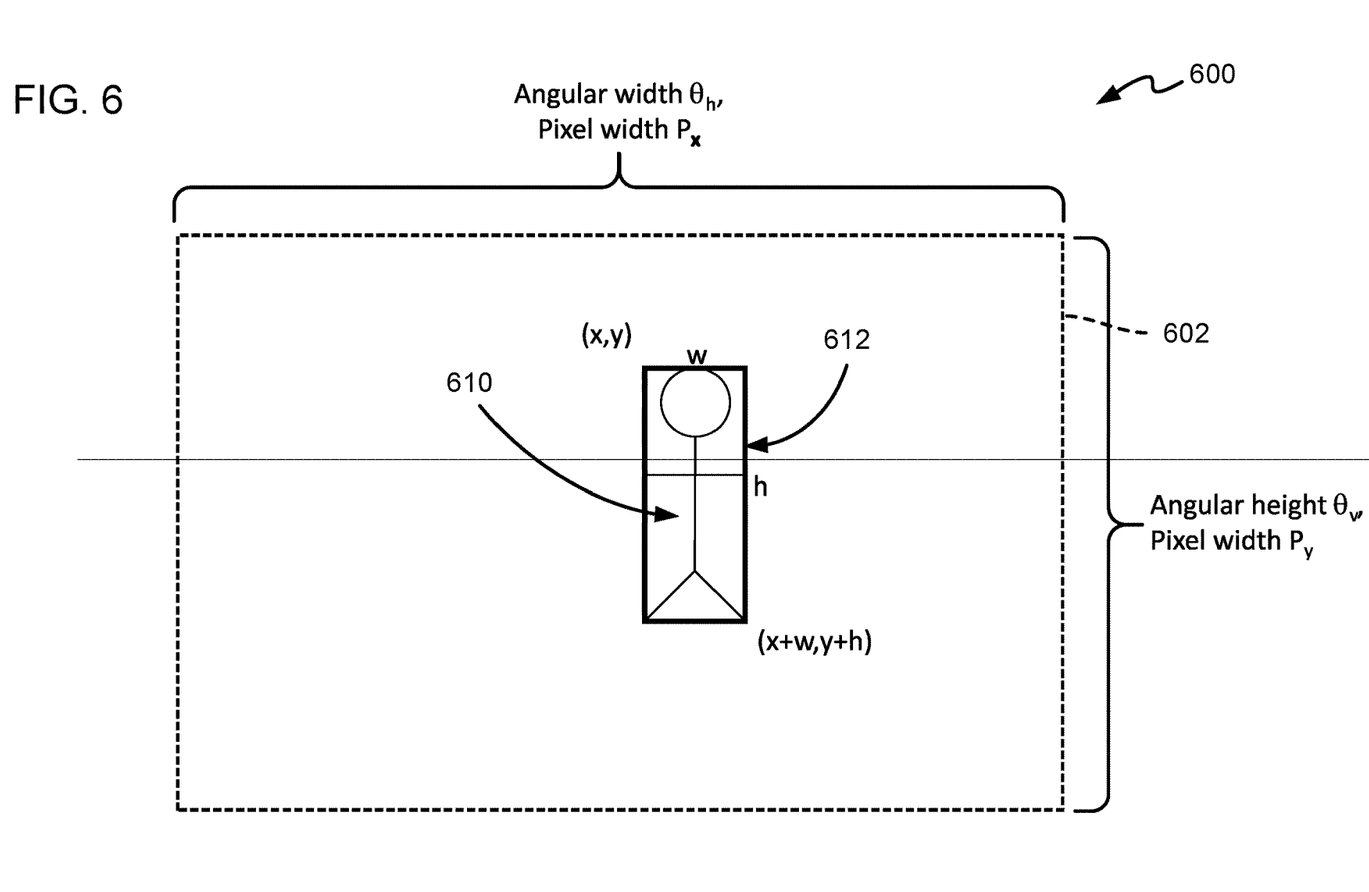
FIG. 6 shows an example interface of the perimeter breach warning system of FIG. 1.
Figure 7:
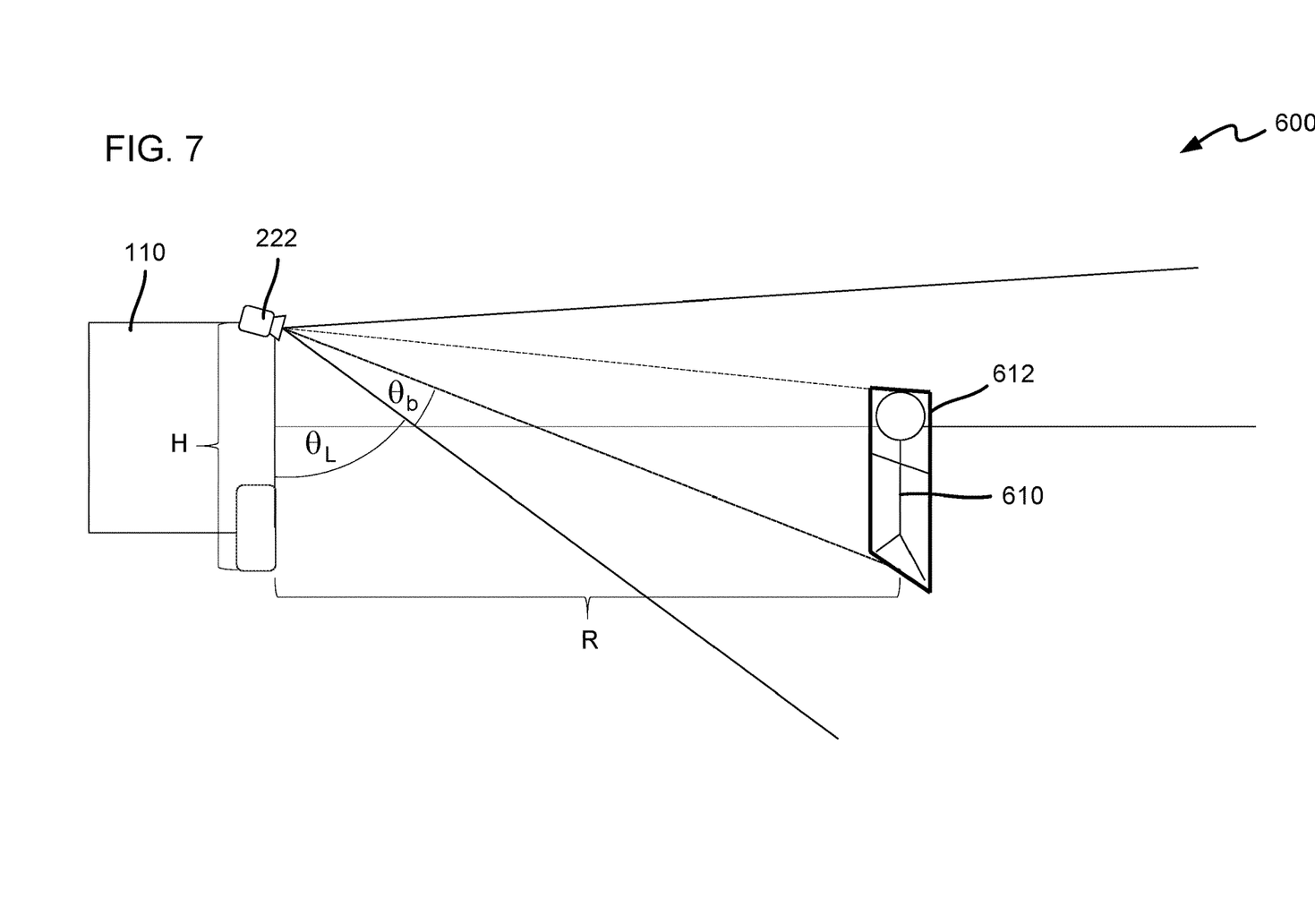
FIG. 7 shows another example interface of the perimeter breach warning system of FIG. 1.

The camera devices 222 can assist in the identification of the object and the object's position, direction of movement, and/or speed. For example, as depicted in FIG. 6, an interface 600 can be provided in the vehicle 110 that depicts the field of view 602 of one or both of the camera devices 222. In this example, the control device 250 is programmed to analyze the field of view 602 and identify an object 610 (i.e., person) within the field of view 602. The control device 250 can further quantify a size of the object 610 by placing a bounding box 612 around the object 610. This will allow the control device 250 to highlight the object 610 on the interface 600.

Referring now to FIG. 6, in some instances the control device 250 can determine the distance and/or height of the object 610. For example, a range R between the vehicle 110 and the object 610 detected in the field of view 602 of the camera device 222 is calculated to be:

$R = H \times \tan(\theta_L + \theta_b)$, where H is the height of the camera's installation above the ground level, $\theta_L$ is the angular elevation of the bottom of the field of view 602 of the camera device 222, and $\theta_b$ is the angular elevation within the field of view 602 of the camera device 222 of the bottom of the bounding box 612 surrounding the object 610, itself calculated to be:

$\theta_b = \theta_v \times (P_y - y - h)/P_y$, where $P_y - y - h$ is the number of vertical pixels between the bottom of the bounding box surrounding the person and the edge of the image, $P_y$ is the number of vertical pixels in the image, and where $\theta_v$ is the vertical angular field of view of the image.

In some embodiments, further devices can be used to enhance the alerting. For example, the camera devices can be used to capture aspects of the surroundings of the vehicle and provide further alerts based thereupon (e.g., any individuals or crowds prior to parking in an area). Further, input from a global positioning system device can provide location information that can be used to determine historical risk trends for a particular area. Further, the time and/or date can be used to determine further aspects of the alerting (e.g., social trends for given time periods). All of these aspects can be used by the system to further enhance or suppress alerting.

The system described herein can be implemented on one or more computing devices. For example, the control device 250 can include one or more computing devices. Each of these computing devices can include a processor and non-transitory memory.

The computing device or devices can be located locally, i.e., in close proximity to the sensors that capture the relevant information, such as within the vehicle. In other examples, the computing devices can be located remotely. In such examples, information from the sensors is transmitted through a network to one or more server and/or cloud computing devices. Those server and/or cloud computing devices can be used to store, analyze and/or provide alerting based upon the data from the sensors.

The computing device or devices, whether located locally and/or remotely, can control, manage, and monitor various aspects of the vehicle and/or detection system. This can include, without limitation, operation of the vehicle, alerting of the passengers, manipulation of on-vehicle equipment, etc.

More specifically, each computing device can include various components, including a memory, a processing system, a secondary storage device, a network interface card, a video interface, a display unit, and an external component interface. In other embodiments, computing devices are implemented using more or fewer hardware components. For instance, in another example embodiment, a computing device does not include a video interface, a display unit, an external storage device, or an input device.

The term computer readable media as used herein may include computer storage media. Computer storage media may include volatile and nonvolatile, removable and non-removable media implemented in any method or technology for storage of information, such as computer readable instructions, data structures, program modules, or other data. The memory includes one or more computer storage media capable of storing data and/or instructions. As used in this document, a computer storage medium is a device or article of manufacture that stores data and/or software instructions readable by a computing device. In different embodiments, the memory is implemented in different ways. For instance, in various embodiments, the memory is implemented using various types of computer storage media. Example types of computer storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system includes one or more physical integrated circuits that selectively execute software instructions. In various embodiments, the processing system is implemented in various ways. For example, the processing system can be implemented as one or more processing cores. In this example, the processing system can comprise one or more Intel, NVidia, AMD, and/or Ti microprocessors, or other manufactures thereof. In another example, the processing system can comprise one or more separate microprocessors.

The secondary storage device includes one or more computer storage media. The secondary storage device stores data and software instructions not directly accessible by the processing system. In other words, the processing system performs an I/O operation to retrieve data and/or software instructions from the secondary storage device. In various embodiments, the secondary storage device is implemented by various types of computer-readable data storage media. For instance, the secondary storage device may be implemented by one or more magnetic disks, magnetic tape drives, CD-ROM discs, DVD-ROM discs, Blu-Ray discs, solid-state memory devices, Bernoulli cartridges, and/or other types of computer-readable data storage media.

The network interface card enables the computing device to send data to and receive data from a communication network. In different embodiments, the network interface card is implemented in different ways. For example, in various embodiments, the network interface card is implemented as an Ethernet interface, a token-ring network interface, a fiber optic network interface, a wireless network interface (e.g., Wi-Fi, WiMAX, etc.), or another type of network interface.

The video interface enables the computing device to output video information to the display unit. In different embodiments, the video interface is implemented in different ways. For instance, in one example embodiment, the video interface is integrated into a motherboard of the computing device. In another example embodiment, the video interface is a video expansion card. In various embodiments, the display unit can be a cathode-ray tube display, an LCD display panel, a plasma screen display panel, a touch-sensitive display panel, an LED screen, a projector, or another type of display unit. In various embodiments, the video interface communicates with the display unit in various ways. For example, the video interface can communicate with the display unit via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The external component interface enables the computing device to communicate with external devices. In various embodiments, the external component interface is implemented in different ways. For example, the external component interface can be a USB interface, a FireWire interface, a serial port interface, a parallel port interface, a PS/2 interface, and/or another type of interface that enables the computing device to communicate with external devices. In different embodiments, the external component interface enables the computing device to communicate with different external components. For example, the external component interface can enable the computing device to communicate with external storage devices, input devices, speakers, phone charging jacks, modems, media player docks, other computing devices, scanners, digital cameras, a fingerprint reader, and other devices that can be connected to the computing device. Example types of external storage devices include, but are not limited to, magnetic tape drives, flash memory modules, magnetic disk drives, optical disc drives, flash memory units, zip disk drives, optical jukeboxes, and other types of devices comprising one or more computer storage media. Example types of input devices include, but are not limited to, keyboards, mice, trackballs, stylus input devices, key pads, microphones, joysticks, touch-sensitive display screens, and other types of devices that provide user input to the computing device.

The memory stores various types of data and/or software instructions. For instance, in one example, the memory stores a Basic Input/Output System (BIOS), and an operating system. The BIOS includes a set of software instructions that, when executed by the processing system, cause the computing device to boot up. The operating system includes a set of software instructions that, when executed by the processing system, cause the computing device to provide an operating system that coordinates the activities and sharing of resources of the computing device.

The examples provided herein allow the computing devices to more efficiently and easily manage and process object detection. For example, the systems provided herein are more efficient at object identification, motion, and classification. This results in a system that performs better, with fewer false alarms and more meaningful interpretation and processing of data.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for object detection within a monitored zone defining a perimeter around a vehicle, the system comprising:
    at least one processor; and
    memory encoding instructions which, when executed by the processor, cause the system to:
        detect an object;
        estimate a speed of the object;
        estimate a direction of the object;
        suppress an alert associated with detection of the object when a size of the detected object is below a lower size threshold value or above an upper size threshold value;
        suppress the alert when the estimated speed of the object is below a speed threshold value; and
        modify the speed threshold value when the estimated direction of the object is towards or away from the vehicle.

2. The system of claim 1, further comprising instructions which, when executed by the at least one processor, cause the system to:
    extrapolate motion vectors linearly; and
    suppress the alert when motion vector extrapolation does not intersect the vehicle.

3. The system of claim 1, wherein a size of the monitored zone is modulated based upon the speed of the object.

4. The system of claim 1, further comprising at least one sensor device to detect the object.

5. The system of claim 4, wherein the at least one sensor device is a Doppler radar device.

6. The system of claim 1, further comprising a lights and siren system on the vehicle, the lights and siren system being programmed to provide the alert.

7. The system of claim 6, wherein the lights and siren system includes a lightbar, wherein, upon the alert, a specific segment of the lightbar is activated to indicate a location or speed of the object.

8. The system of claim 1, wherein the object detection is activated when the vehicle is stationary and deactivated when the vehicle exceeds a speed threshold.

9. The system of claim 1, further comprising a camera, wherein the camera is automatically activated when the object is detected to capture still or motion images of the object.

10. The system of claim 9, wherein the still or motion images of the object are used to determine the size of the detected object.

11. An object detection system, comprising:
    at least one Doppler radar device;
    at least one camera;
    at least one processor; and
    memory encoding instructions which, when executed by the processor, cause the system to:
        detect an object using the Doppler radar device;
        estimate a speed of the object;
        estimate a direction of the object;
        identify if the object is a human body using machine learning;
        suppress an alert when the object is determined not to be a human body;
        suppress the alert when the estimated speed of the object is below a speed threshold value; and
        modify the speed threshold value based on the estimated direction of the object.

12. The system of claim 11, further comprising instructions which, when executed by the at least one processor, cause the system to infer human mood, wherein the alert is suppressed when mood is not classified as consistent with an alert category of moods.

13. The system of claim 11, further comprising instructions which, when executed by the at least one processor, cause the system to measure gait, wherein the alert is suppressed when the gait is not consistent with carriage of a weapon.

14. The system of claim 11, further comprising instructions which, when executed by the at least one processor, cause the system to classify hand-held objects, wherein the alert is suppressed when the hand-held objects are classified as not a weapon.

15. The system of claim 11, further comprising instructions which, when executed by the at least one processor, cause the system to:
    capture an image of a face using the camera;
    identify an identity of the human body using facial recognition; and suppress the alert when the identity is not classified as consistent with a roster of alert identities.

16. The system of claim 15, further comprising instructions which, when executed by the at least one processor, cause the system to classify clothing on the human body, where the alert is suppressed when the clothing is classified as consistent with a police officer's uniform.

17. The system of claim 11, further comprising instructions which, when executed by the at least one processor, cause the system to:
    determine a location;
    use the location to provide a historical assessment of risk for that location; and
    suppress the alert based upon the historical assessment of risk.

18. A method for detecting an object entering a perimeter surrounding a vehicle, the method comprising:
    detecting the object using Doppler radar;
    estimating a speed of the object;
    estimating a direction of the object;
    identifying if the object is a human body using machine learning;
    suppressing an alert when the object is determined not to be a human body;
    suppressing the alert when the estimated speed of the object is below a speed threshold value; and
    modifying the speed threshold value when the estimated direction of the object is towards or away from the vehicle.

* * * * *